(12) United States Patent
Lilie et al.

(10) Patent No.: US 6,644,945 B2
(45) Date of Patent: Nov. 11, 2003

(54) VALVE ARRANGEMENT FOR LIMITING PISTON STROKE COLLISIONS IN A RECIPROCATING COMPRESSOR WITH A LINEAR MOTOR

(75) Inventors: Dietmar Erich Bernhard Lilie, Joinville (BR); Rinaldo Puff, Joinville (BR)

(73) Assignee: Empresa Brasileira de Compressores S.A. -Embraco, Joinville (BR)

( * ) Notice: Subject to any disclaimer, the term of this patent is extended or adjusted under 35 U.S.C. 154(b) by 0 days.

(21) Appl. No.: 10/000,554

(22) Filed: Nov. 16, 2001

(65) Prior Publication Data

US 2002/0038551 A1 Apr. 4, 2002

Related U.S. Application Data

(63) Continuation of application No. PCT/BR00/00054, filed on May 12, 2000.

(30) Foreign Application Priority Data

May 17, 1999 (BR) .............................................. 9902513

(51) Int. Cl.[7] ................................................ F04B 53/14
(52) U.S. Cl. ........................ 417/571; 417/416; 417/415; 417/509; 91/394; 91/395; 91/409; 137/843; 137/855
(58) Field of Search ................................. 417/416, 415, 417/571, 572, 509; 91/394, 395, 409; 137/843, 855, 857

(56) References Cited

U.S. PATENT DOCUMENTS

| 3,937,600 | A | | 2/1976 | White ........................ 417/416 |
| 5,193,433 | A | * | 3/1993 | Reimer ........................ 92/85 B |
| 5,622,484 | A | * | 4/1997 | Taylor-McCune et al. .. 417/393 |
| 5,655,887 | A | * | 8/1997 | Chou .......................... 417/63 |
| 5,816,783 | A | * | 10/1998 | Oshima et al. .............. 417/415 |
| 5,839,472 | A | * | 11/1998 | Shintoku et al. ............. 137/856 |
| 6,311,712 | B1 | * | 11/2001 | Meyer ............................ 137/8 |

FOREIGN PATENT DOCUMENTS

| EP | 0 093 705 | 11/1983 | ........... F04B/49/02 |
| EP | 0 909 896 | 4/1999 | ........... F04B/35/04 |

* cited by examiner

Primary Examiner—Charles G. Freay
Assistant Examiner—Emmanuel Sayoc
(74) Attorney, Agent, or Firm—Darby & Darby

(57) ABSTRACT

A reciprocating compressor includes a linear motor having a piston reciprocating inside a cylinder. A cylinder head is provided with suction and discharge orifices. A valve means is mounted inside the cylinder and has an operative position, seated against the discharge orifice. The operative position is defined when the top of the piston is within a certain distance from the cylinder head. The distance is defined, so that, at the end of the compression stroke of the piston, a determined pressure is reached inside the cylinder, and the pressure results in a force on the piston. The force is opposite to a force which is impelling the piston and which is sufficient to interrupt its compression stroke before impacting the cylinder head.

8 Claims, 2 Drawing Sheets

VALVE ARRANGEMENT FOR LIMITING PISTON STROKE COLLISIONS IN A RECIPROCATING COMPRESSOR WITH A LINEAR MOTOR

This is a continuation of international application Ser. No. PCT/BR00/00054 filed May 12, 2000.

FIELD OF THE INVENTION

The present invention refers to a piston stroke limiting device for a reciprocating compressor of the type driven by a linear motor and applied to refrigeration systems used in small refrigerating appliances, such as refrigerators, freezers, drinking fountains, etc.

BACKGROUND OF THE INVENTION

In reciprocating compressors with a linear motor, the gas compression mechanism occurs by the axial movement of approximation and separation of a piston inside a cylinder, in relation to a cylinder head which is mounted to a cylinder end and where suction and discharge valves are provided for regulating the admission and discharge of the gas in relation to the cylinder.

The piston is driven by an actuator, which sustains a magnetic component actuated by the linear motor. The piston is connected to a resonant spring, with which it forms, together with the magnetic component, the resonant assembly of the compressor.

This resonant assembly has the function of developing a linear reciprocating movement, making the movement of the piston inside the cylinder exert a compression action on the gas admitted by the suction valve, up to the point in which said gas may be discharged, through the discharge, to the high pressure side of the refrigeration system to which the compressor is mounted.

Variations in the operational conditions of the compressor, or variations in the feeding pressure may make the resonant assembly displace beyond an acceptable limit, making the piston top strike the cylinder head, causing damages to the compressor. Several forms for controlling the travel of the piston have already been proposed, both the electronic forms (U.S. Pat. Nos. 5,156,005, 5,342,176, 5,450,521, 5,592,073), which control the current supplied to the motor, as a function of the piston position, and the mechanical forms (usually employed in Stirling machines), such as the provision of gas discharge channels, or pneumatic or mechanical springs. Electronic controls, which are able to precisely control the piston position, are extremely expensive, besides presenting an inherent inertia to the system. The same occurs with the mechanical solutions. Such inertia allows the occurrence of occasional impacts, which, with time, cause damages to the top of the piston and the cylinder head.

DISCLOSURE OF THE INVENTION

Thus, it is a general objective of the present invention to provide a reciprocating compressor with a linear motor, of low cost and easy construction, which minimizes the occurrence of impacts of the piston against the cylinder head, without presenting the constructive inconveniences of the known prior art solutions.

These and other objectives are attained by a reciprocating compressor with a linear motor, comprising a piston reciprocating inside a cylinder having an end closed by a cylinder head provided with suction and discharge orifices, to which are operatively associated suction and discharge valves, said compressor comprising a valve means mounted inside the cylinder and having an operative position, seated against the discharge orifice, and an inoperative position, spaced from said discharge orifice, the operative position being defined when the top of the piston is within a certain distance from the cylinder head, said distance being defined, so that, at the end of the compression stroke of the piston, be reached inside the cylinder a determined pressure that will result in a force on the piston opposite to that force which is impelling said piston and which is sufficient to interrupt its compression stroke before impacting the cylinder head.

BRIEF DESCRIPTION OF THE DRAWINGS

The invention will be described below, with reference to the appended drawings, in which.

BEST MODE OF CARRYING OUT THE INVENTION

Figure 1:
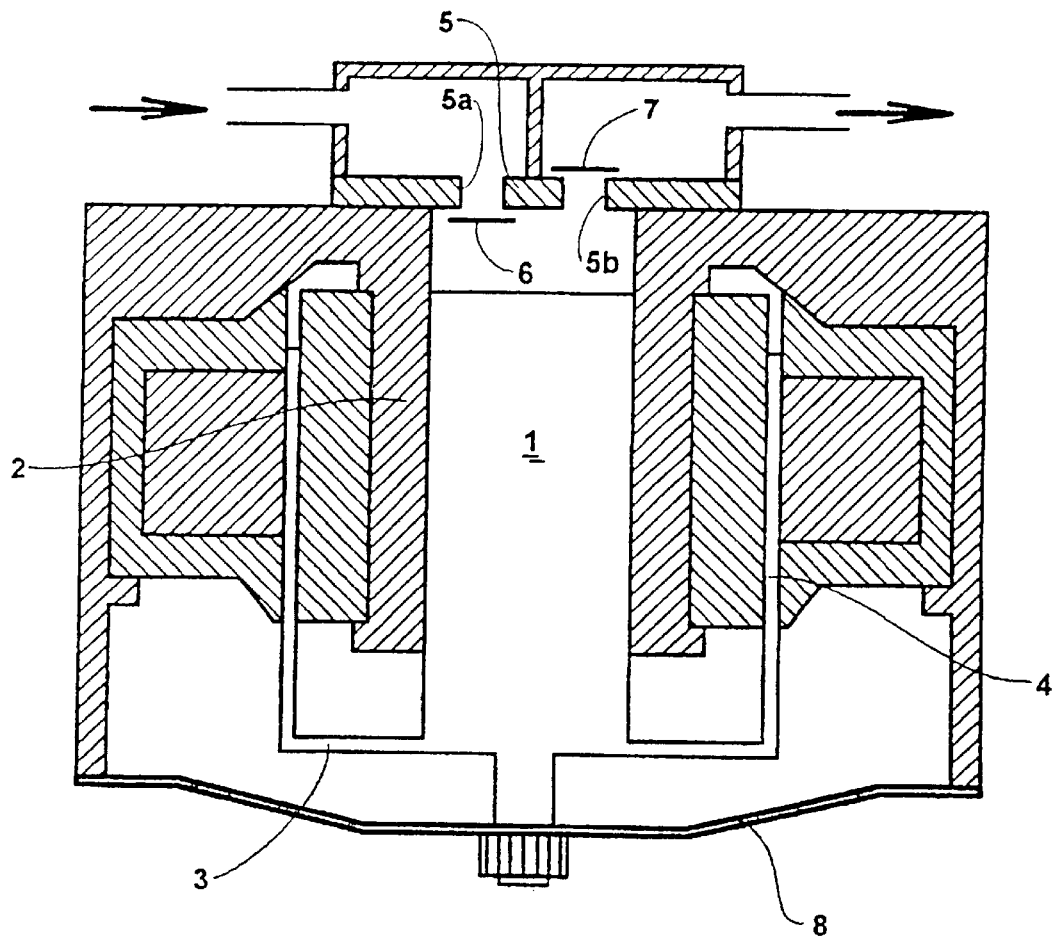
FIG. 1 shows, schematically, a longitudinal diametrical sectional view of part of a reciprocating compressor with a linear motor, constructed according to the prior art.

The present invention will be described in relation to a reciprocating compressor used in refrigeration systems and driven by a linear motor mounted inside a hermetic shell (not illustrated), which connects the compressor to a refrigeration system, for example. In the illustrated construction, the compressor has a piston 1 provided inside a cylinder 2 and coupled to an actuating means 3, which is usually tubular, external to the cylinder 2 and provided with a magnet 4 which is axially impelled upon energization of the linear motor.

The separation and approximation movements of the piston 1 inside the cylinder 2 in relation to a cylinder head 5 mounted to an end of the cylinder 2 determines, respectively, the suction and compression operations of the gas in the compressor.

In the cylinder head 5 is provided a suction orifice 5a, where is mounted a suction valve 6, and a discharge orifice 5b, where is mounted a discharge valve 7, said valves regulating the admission and discharge of the gas in relation to the cylinder 2.

Piston 1 is connected to a resonant spring 8 and forms with the latter and with the magnet 4 a resonant assembly.

According to the present invention, to avoid the occurrence of the occasional impacts of the top of piston 1 against the cylinder head 5, the compressor of the present invention is provided with a piston stroke limiting device comprising a valve means 10, to be described below, which closes the discharge orifice 5b at the end of the compression stroke of piston 1, when the latter gets too close to the cylinder head 5. In this condition, the gas contained in the volume formed inside the cylinder 2 between the cylinder head 5 and the top of the piston 1 reaches a determined pressure resulting in a force upon the latter which is opposite to that force which is impelling said piston 1 during its compression stroke, said force being sufficient to interrupt the compression stroke of the piston 1 and avoid the impact thereof against the cylinder head 5. The compressed gas chamber formed therein functions as a spring or a pneumatic damper, braking the piston 1 at the end of its travel in the compression stroke.

According to the present invention, the valve means 10 is mounted inside the cylinder, for example, to one of the parts defined by the top of the piston 1 and by an inner surface of the cylinder head 5, in order to have an operative position, seated against the discharge orifice 5b, substantially sealing the latter, and an inoperative position, spaced from said discharge orifice 5b. The inoperative position is defined when the top of the piston 1 is within a certain distance D from the inner surface 4a of the cylinder head 5, said distance D being defined in order to reach, at the end of the compression stroke, the determined pressure resulting upon the interruption of the travel of piston 1.

Figure 2:
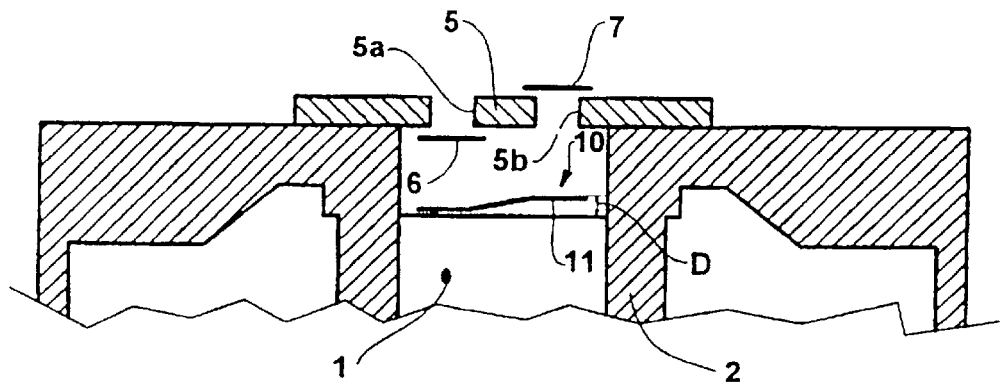
FIG. 2 shows, schematically, a longitudinal diametrical sectional view of the top region of the reciprocating compressor with a linear motor, constructed according to a way of carrying out the present invention, with the piston close to the upper dead point region.
Figure 3:
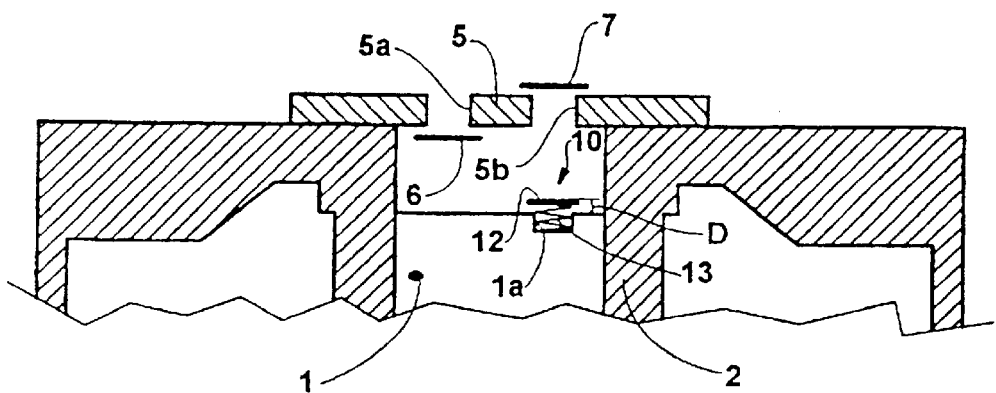
FIG. 3 shows a similar view to that of FIG. 2 of a second constructive form of the present invention for the top region of the compressor.
Figure 4:
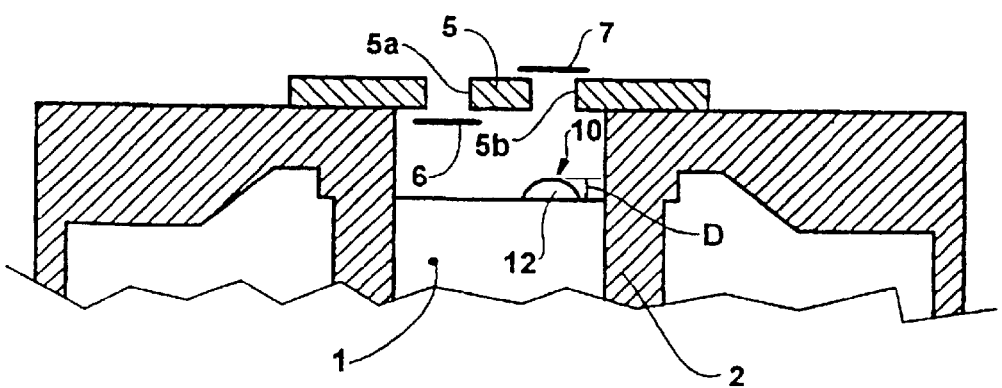
FIG. 4 shows a similar view to that of FIG. 2 of a third constructive form of the present invention, for the top region of the compressor.

In the constructions illustrated in FIGS. 2–4, the valve means 10 is provided inside the piston 1.

The longer the distance D, the higher will be the pressure reached inside the cylinder 2, and the higher this pressure, the higher will be the dampening effect of the impact of said piston 1 against the cylinder head 5.

The determination of a partial closing condition of the discharge orifice 5b by the valve means 10, providing a restricted gas discharge at the compression stroke end condition of piston 1, generates a dissipation of energy, avoiding that the gas pressure reached in said distance D results, in the condition in which the displacement of the piston is reverted to its suction stroke, in a force which also allows resonance to occur.

In FIG. 2 is shown a constructive form for the present invention, in which the valve means 10 is defined by a flexible vane having a mounting portion, which is constantly seated on the surface where it is provided, and a closing portion 11, overlapping the discharge orifice 5b and which is spaced from the adjacent surface where the vane is provided, when the latter is in its inoperative position, said spacing being defined in such a way that, in the operative position, the piston 1 reaches the determined distance D of the cylinder head 5.

To obtain the partial sealing condition, the closing portion 11 is provided with a throughbore 14 opened to the inside of the discharge orifice 5b and dimensioned to permit a restricted discharge upon closing the discharge orifice 5b.

In FIG. 3, another embodiment is illustrated, in which the valve means 10 comprises a sealing element 12, which is mounted, by means of an elastic element 13, to the part in which the valve means 10 is provided, said elastic element 13 being, for example, a helical spring mounted in a housing 1a defined in piston 1, from the top surface thereof.

In the construction of FIG. 4, the valve means 10 comprises a sealing element 12 in elastomeric material, with the shape of a spherical cup, for example.

To operate the limiting device of the present invention, a simple and conventional electronic system is used, which, for instance, detects the presence of the valve means 10 when seated onto the discharge orifice 5b and determines, to the motor which drives the piston 1, a power reduction to the latter, said reduction being maintained until the end of the seating condition of the valve means 10 against the cylinder head 5 has been detected.

What is claimed is:

1. A reciprocating compressor with a linear motor, comprising a piston (1) reciprocating inside a cylinder (2) having an end closed by a cylinder head (5) provided with suction and discharge orifices (5a, 5b), to which are operatively associated suction (6) and discharge (7) valves, wherein that it comprises a valve means (10) for restricting gas discharge mounted inside the cylinder (2) and having an operative position, seated against the discharge orifice (5b ) and sealing the discharge orifice (5b) at least partially, and an inoperative position, spaced from said discharge orifice, the operative position being defined when the top of the piston (1) is within a certain distance (D) from the cylinder head (5), said distance being defined, so that, at the end of the compression stroke of the piston (1), be reached inside the cylinder (2) a determined pressure that will result in a force on the piston (1) and which is sufficient to interrupt its compression stroke before impacting the cylinder head (5).

2. The compressor of claim 1, wherein the valve means (10) is mounted to one of the parts defined by the top of the piston (1) and by the inner surface of the cylinder head (5).

3. The compressor of claim 1, wherein the valve means (10) is defined by a vane having a closing portion (11) overlapping the discharge orifice (5b).

4. The compressor of claim 3, wherein the closing portion (11) is provided with a throughbore (14), which is opened to the inside of the discharge orifice (5b) and dimensioned to allow a restricted discharge, upon closing the discharge orifice (5b).

5. The compressor of claim 4, wherein the valve means (10) comprises a sealing element (12) mounted to one of the parts defined by the top of the piston (1) and by the inner surface of the cylinder head (5) by means of an elastic element (13).

6. The compressor of claim 5, wherein the elastic element (13) is provided in a housing (1a) defined in the piston (1), from the top surface thereof.

7. The compressor of claim 2, wherein the valve means (10) comprises a sealing element (12) of elastomeric material.

8. The compressor of claim 1, wherein the sealing element (12) has the shape of a spherical cup.

* * * * *